United States Patent Office 3,025,328
Patented Mar. 13, 1962

3,025,328
ALICYCLIC ETHERS
Arthur W. Carlson, Chicago, Ill., assignor to Velsicol Chemical Corporation, Chicago, Ill., a corporation of Illinois
No Drawing. Filed Oct. 27, 1959, Ser. No. 848,918
5 Claims. (Cl. 260—611)

This invention relates to new compositions of matter containing both alcohol and ether groups.

More particularly, this invention relates to new ether-alcohols of the general formula R—O—(CH$_2$)$_y$—OH, wherein R is selected from the group consisting of cyclopentenyl, cyclohexenyl, chlorinated alicyclic radicals having from 5 to 6 carbon atoms in the ring, and $y$ is an integer from 2 to 4.

These new compounds are prepared by the reaction of a monochloro compound R—Cl with a diol

HO—(CH$_2$)$_y$—OH wherein R and $y$ are as defined above. Thus the reaction can be represented schematically as follows:

R—Cl + HO—(CH$_2$)$_y$—OH
→ R—O—(CH$_2$)$_y$—OH + HCl

The reaction can be effected within a wide range of temperatures. A preferred range of reaction temperatures is between 15° and 60° C., although temperatures above and below this range can be used, since the exact temperature is not critical. An inert solvent such as benzene or xylene can be used to facilitate carrying out the reaction, but in many cases the glycol, when used in excess, will serve as a reactant and as solvent. An acid scavenger such as free ammonia can be used to remove free hydrogen chloride from the reaction medium as it is formed.

The new compositions of matter which are the object of this invention are useful as essential intermediates in the preparation of new herbicidal compositions of matter. In accordance therewith, the ether-alcohols of this invention, namely R—O—(CH$_2$)$_y$OH, are condensed with a chlorosulfinate

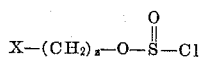

$$X-(CH_2)_z-O-\overset{O}{\underset{\|}{S}}-Cl$$

to give the new sulfite esters

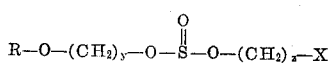

$$R-O-(CH_2)_y-O-\overset{O}{\underset{\|}{S}}-O-(CH_2)_z-X$$

wherein R is as previously defined, $y$ and $z$ are integers from 2 to 4, and X is selected from the group consisting of Cl, Br, and F. These new sulfite esters have been found to be very useful substances for the control of noxious plant growth.

The reactive hydroxy, ether, and halogen substituents as well as the unsaturation present in various combinations in the compounds of this invention make apparent a variety of uses for these compounds to those skilled in the art. Thus, these compounds R—O—(CH$_2$)$_y$OH can be treated with concentrated sulfuric acid in the presence of acetic anhydride to convert them to the corresponding organic sulfates, R—O—(CH$_2$)$_y$—O—SO$_3$H, which are surface active agents useful, for example, as emulsifiers for insecticides. Also, the esters of the compounds of this invention made by condensing these alcohols with acids, preferably dibasic acids such as adipic or phthalic acids, are substances which are useful as plasticizers for resins such as the polyvinyl chlorides. For example, the condensation of 2-(2-cyclopentenyloxy)ethanol with adipic acid in an inert solvent such as an aromatic hydrocarbon forms the ester, di-2-(2-cyclopentenyloxy)-ethyl adipate, a high molecular weight compound suitable as a plasticizer for polyvinyl chloride.

Further, when R of the above formula is a cyclopentenyl or a cyclohexenyl radical, this reactive unsaturation can be of extreme value. Thus, these compounds can enter into virtually all standard reactions of olefins including the formation of various polymers and copolymers. It is the combination of the OH group and the functionality of the R group which imparts to the present compound a wide variety of utility in itself and as an intermediate useful for the preparation of other compounds. The functionality present in the R group of the present compounds can be in the form of unsaturation which can be used in the preparation of a variety of polymers.

The following example is given to illustrate the manner in which the new compositions of this invention may be prepared:

EXAMPLE

*Preparation of 2-(2-Cyclopentenyloxy)Ethanol*

3-chlorocyclopentene (107 g., 1.04 mol) was added dropwise with stirring over a period of 1 hour to 200 ml. of ethylene glycol in the presence of methyl red indicator. Ammonia (18 g., 1.06 mol) in 150 ml. ethylene glycol was added simultaneously with the 3-chlorocyclopentene at such rate that the reaction mixture became basic to the methyl red only momentarily every 2 to 3 minutes. The temperature of the reaction mixture was maintained at 25 to 30° C. When the addition was complete, the reaction mixture was allowed to stand overnight and was then extracted repeatedly with ethyl acetate. The solvent was distilled off, and the residue was dissolved in ethyl ether, washed with water, dried over sodium sulfate, and freed of ether by distillation. The water washings were extracted with ether, and the ether solution was washed with 10% sodium chloride solution, dried over sodium sulfate, filtered, and freed of ether. The combined residues from the ether evaporations were distilled in vacuo to give 77 g. (60% of theory) of 2-(2-cyclopentenyloxy)ethanol, boiling at 85 to 91° under 10 mm. pressure and having an index of refraction (D line) of 1.4730 at 20°.

It is apparent that a wide variety of other new compounds which are useful as chemical intermediates and which fall within the scope of this invention can be prepared by substituting other chemical compounds for the starting materials used in the above example. Thus, products in which R is a six-membered ring can be obtained by using such compounds as 3-chlorocyclohexene or monochlorocyclohexane instead of the 2-chlorocyclopentene, whereupon the final useful chemical intermediate will be 2-(2-cyclohexenyloxy)ethanol and 2-(cyclohexyloxy)ethanol. Similarly, for example, products in which R is halogenated can be made by replacing the 3-chlorocyclopentene with 1,2-dichlorocyclopentane. The resulting final product from the starting material which has been cited will then be 2-(2-chlorocyclopentyloxy)-ethanol. The radical (CH$_2$)$_y$ can be made to contain 3 or 4 carbon atoms by replacing the ethylene glycol used in the example with 1,3-pentanediol or 1,4-butanediol, respectively. Thus, when these compounds are used with 1,2-dichlorocyclopentane as the other starting material, the final products useful as chemical intermediates are 3-(2-chlorocyclopentyloxy)propanol and 4-(2-chlorocyclopentyloxy)butanol, respectively.

This application is a continuation-in-part of my copending application Serial No. 647,198, filed March 20, 1957 and now abandoned.

I claim:

1. A compound of the formula R—O—(CH$_2$)$_y$—OH, wherein y is an integer from 2 to 4 and R is a radical selected from the group consisting of 2-cyclopentenyl, 2-chlorocyclopentyl, 2-cyclohexenyl, and 2-chlorocyclohexyl.

2. 2-(2-cyclopentenyloxy)ethanol.
3. 2-(2-cyclohexenyloxy)ethanol.
4. 4-(2-chlorocyclopentyloxy)butanol.
5. 3-(2-chlorocyclopentyloxy)propanol.

References Cited in the file of this patent

UNITED STATES PATENTS

| | | |
|---|---|---|
| 2,802,878 | Monroe et al. | Aug. 13, 1957 |
| 2,848,500 | Funk | Aug. 19, 1958 |

OTHER REFERENCES

Bergmann et al.: Annalen, vol. 448, p. 51 (1926).